US008880250B2

(12) United States Patent
Wu et al.

(10) Patent No.: US 8,880,250 B2
(45) Date of Patent: Nov. 4, 2014

(54) DC BUS VOLTAGE CONTROL

(75) Inventors: Long Wu, Fargo, ND (US); Chris J. Tremel, West Fargo, ND (US); Zimin W. Vilar, Dubuque, IA (US); Alan K. Gilman, West Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 269 days.

(21) Appl. No.: 13/036,765

(22) Filed: Feb. 28, 2011

(65) Prior Publication Data
US 2012/0221183 A1 Aug. 30, 2012

(51) Int. Cl.
B60L 11/00 (2006.01)
G01R 19/00 (2006.01)
H02P 31/00 (2006.01)
B60L 15/20 (2006.01)

(52) U.S. Cl.
CPC ..................................... B60L 15/20 (2013.01)
USPC ................................ 701/22; 702/64; 318/767

(58) Field of Classification Search
USPC ............ 701/22; 702/57, 64, 65; 318/767, 798
See application file for complete search history.

(56) References Cited

U.S. PATENT DOCUMENTS

| 4,023,083 | A | 5/1977 | Plunkett |
| 4,814,677 | A | 3/1989 | Plunkett |
| 5,428,283 | A | 6/1995 | Kalman et al. |
| 5,486,748 | A | 1/1996 | Konrad et al. |
| 5,914,582 | A | 6/1999 | Takamoto et al. |
| 6,275,000 | B1 | 8/2001 | Nishimura |
| 6,768,284 | B2 * | 7/2004 | Lee et al. ...................... 318/808 |
| 7,045,988 | B2 | 5/2006 | Ha et al. |
| 7,157,878 | B2 | 1/2007 | Collier-Hallman |
| 7,573,227 | B2 | 8/2009 | Kasaoka et al. |
| 7,733,044 | B2 | 6/2010 | Nakamura et al. |
| 8,093,742 | B2 * | 1/2012 | Gupta et al. .................... 290/44 |
| 2005/0179264 | A1 | 8/2005 | Ganev |
| 2006/0202582 | A1 * | 9/2006 | Umesaki et al. .............. 310/162 |
| 2006/0247829 | A1 | 11/2006 | Sato |
| 2007/0164693 | A1 | 7/2007 | King et al. |
| 2008/0084171 | A1 | 4/2008 | Leehey et al. |
| 2008/0116842 | A1 * | 5/2008 | Cheng et al. .................. 318/807 |

OTHER PUBLICATIONS

Peterchev et al., Load-Line Regulation with Estimated Load-Current Feedforward: Application to Microprocessor Voltage Regulators, IEEE Transactions on Power Electronics, vol. 21, No. 6, Nov. 2006, pp. 1704-1717.*

(Continued)

Primary Examiner — Tuan C. To
Assistant Examiner — Aaron L Troost
(74) Attorney, Agent, or Firm — Harness, Dickey & Pierce, P.L.C.

(57) ABSTRACT

Provided is a method and controller for controlling a vehicle dc bus voltage. The method includes generating a parameter. The parameter is based on a reference dc bus voltage squared. The method includes controlling the vehicle dc bus voltage based on the parameter and a detected dc bus voltage. The method may also include generating another parameter based on a power demand associated with at least one of a motoring mode operation and a generating mode operation of a traction motor associated with the vehicle. The power demand is indicated in a message received via a dedicated high speed data bus. The method includes controlling the vehicle dc bus voltage based on the another parameter.

16 Claims, 9 Drawing Sheets

(56) References Cited

OTHER PUBLICATIONS

M. Elbuluk and M. Kankam, "Speed Sensorless Induction Motor Drives for Electrical Actuators: Schemes, Trends and Tradeoffs," National Aerospace and Electronics Conference cosponsored by IEEE, Wright-Patterson AFB, Dayton, OH, Jul. 14-18, 1997.

S. Van Haute et al., "Design and Control of a Permanent Magnet Synchronous Motor Drive for a Hybrid Electric Vehicle," Katholieke University Leauven, Belgium.

US 7,595,604 Sep. 29, 2009, Tomigashi.

Improved Trajectory Control for an Interior Permanent Magnet Synchronous Motor Drive With Extended Operating Limit.

Massachusetts Institute of Technology Department of Electrical Engineering and Computer Science 6.061 Introduction to Power Systems.

International Search Report and the Written Opinion of the International Searching Authority dated Jun. 1, 2012 (13 pages).

International Preliminary Report dated Sep. 3, 2013 (10 pages).

\* cited by examiner

DC BUS VOLTAGE CONTROL

FIELD

Embodiments relate to controlling a dc bus voltage vehicle electric drive system.

BACKGROUND

Vehicles (e.g., automobiles, tractors and excavators) often include electrical applications (e.g., electric drives). A dc bus voltage may be regulated by controlling a generator. Typically the generator is driven by a diesel engine running at a constant speed. The established dc bus voltage may then provide electric power to many motoring applications on the vehicle.

Typically the diesel engine and the generator each have an associated controller. The generator controller receives a control signal (e.g., a torque control signal) to indicate a manner by which the controller should be controlling the generator. For example, the control signal may indicate a steady-state, an increased demand or a decreased demand. The diesel engine controller maintains a shaft speed of the generator. In this way the generator maintain a desired dc bus voltage.

Further, if the electrical motor is configured as a drive motor (e.g., a traction motor) the motor may also operate to charge the vehicle dc bus during a vehicle regenerative braking period. Regenerative braking is an energy recovery mechanism which slows the vehicle 100 down by converting the vehicle's 100 kinetic energy into another form (e.g., electric energy), which can be either dissipated immediately across crow bar resistor or stored until needed. The energy recovered may be used to maintain a desired dc bus voltage as well.

SUMMARY

One embodiment includes a method of controlling a vehicle dc bus voltage. The method includes generating a first parameter. The first parameter is based on a reference dc bus voltage squared. The method includes controlling the vehicle dc bus voltage based on the first parameter and a detected dc bus voltage.

Another embodiment includes a method of controlling a vehicle dc bus voltage. The method includes generating a first parameter based on a demand associated with at least one of a motoring mode operation and a generating mode operation of a traction motor associated with the vehicle. The demand is indicated in a message received via a dedicated high speed data bus. The method includes controlling the vehicle dc bus voltage based on the first parameter.

Another embodiment includes a controller for controlling a vehicle dc bus voltage. The controller includes a first module configured to generate a first parameter. The first parameter is based on a reference dc bus voltage squared. The controller includes a voltage controller configured to control the vehicle dc bus voltage based on the first parameter and a detected dc bus voltage.

Another embodiment includes a controller for controlling a vehicle dc bus voltage. The controller includes an interface configured to generate a first parameter based on a power demand associated with at least one of a motoring mode operation and a generating mode operation of a traction motor associated with the vehicle. The power demand is indicated in a message received via a dedicated high speed data bus. The first parameter is used to control the vehicle dc bus voltage.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
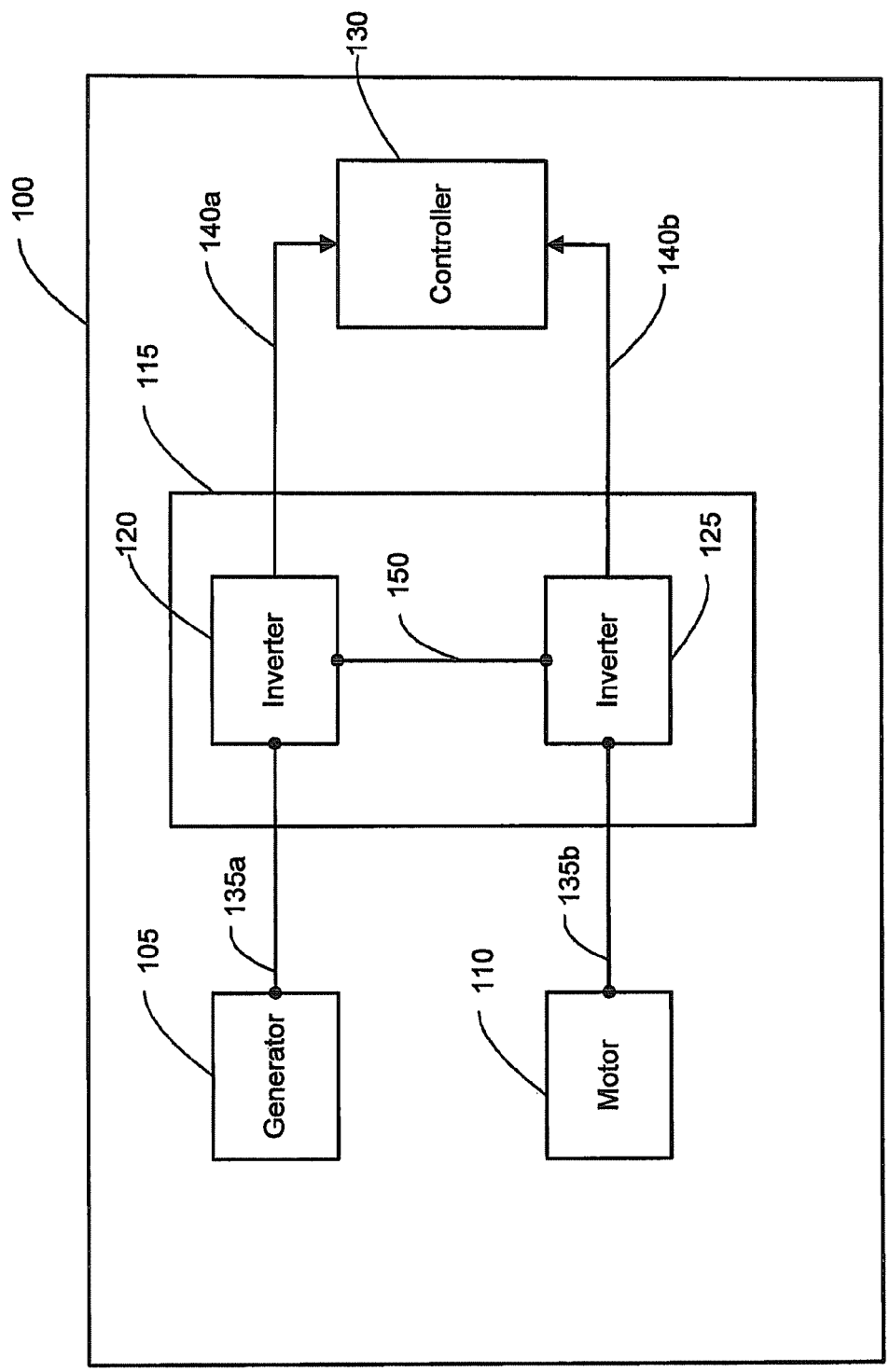
FIG. 1 illustrates a vehicle according to example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be tee a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some faun of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As described above, vehicles (e.g., automobiles, tractors and excavators) often include electrical applications (e.g., electric drives including traction motor and generator). A dc bus voltage may be regulated by controlling a generator in a braking mode and/or motoring mode.

There are three major reasons to maintain the stability of dc bus voltage with small voltage oscillation and sufficiently fast response time. First, a traction motor often requires a large amount of power with fast dynamic load change. If vehicle dc bus voltage drops significantly, even during a period of transient voltage, traction motor current regulation (at high speed deep flux weakening region) may be short of voltage and lead to a failure of a motor controller associated with the traction motor.

Second, if an interior permanent magnet (IPM) machine is used as a generator and the IPM machine may be run at high speeds, a flux weakening region may result. The IPM machine torque generating capability may also be limited by dc bus voltage variations. If the dc bus voltage is decreasing due to high load demand, a controller associated with the IPM machine (generator) may not be able to recover the dc bus voltage level.

Finally, when a dc bus voltage exceeds a preset threshold value, brake chopper IGBT (a known mechanism for protecting controller hardware) may be turned on to dissipate power into a crow bar resistor in order to avoid an overvoltage condition on the dc bus.

FIG. 1 illustrates a vehicle 100 according to at least one example embodiment. As shown in FIG. 1 the vehicle 100 may include a generator 105, a traction motor 110, a dual inverter 115 and a controller 130. The dual inverter 115 may include inverters 120 and 125.

The vehicle 100 may be for example, an automobile, a hybrid automobile, a tractor, an excavator, and the like. The generator 105 may be a 3-phase ac generator. The generator 105 may include a rotor attached to a diesel engine shaft (not shown) or a gasoline engine shaft (not shown), may or may not through a gear box. The motor 110 may be a 3-phase ac motor. The motor 110 may be a traction motor. The motor 110 may drive, for example, a wheel, a track or some other drive mechanism (not shown) via a mechanical drive shaft associated with the vehicle 100.

The dual inverter 115 may convert an ac voltage to a dc voltage and/or a dc voltage to an ac voltage. Inverter 120 may convert an ac voltage associated with the generator 105 a dc voltage to control a dc voltage associated with common dc bus 150. For example, the generator 105 generates an ac voltage. The inverter 120 converts the ac voltage into a dc voltage. The inverted dc voltage is applied to dc bus 150 which in turn provides dc voltage (and power) to the electrical applications (e.g., motor 110) throughout the vehicle 100. For example, inverter 125 may convert the dc bus voltage associated with dc bus 150 to an ac voltage to drive motor 110 for traction purposes.

In addition, for example, the motor 110 may feed power back to a common dc bus 150 during a vehicle regenerative braking period. Regenerative braking is an energy recovery mechanism which slows the vehicle 100 by converting the vehicle's 100 kinetic energy into another form (e.g., electric energy), which can be either used immediately or stored until needed. Regenerative braking is known to those skilled in the art and will not be described further for the sake of brevity. The energy recovered may be used to maintain a desired dc bus voltage at dc bus 150. This may be achieved by running generator 105 in motoring mode to transmit power back to the engine.

The dual inverter 115 may also convert a dc voltage to an ac voltage. Each of the inverters 120 and 125 may convert a dc voltage associated with a dc bus 150 to an ac voltage for use by the generator 105 and the motor 110. For example, the ac voltage may be applied to the stator of the generator 105 and the motor 110. Application of the ac voltage to the generator 105 and the motor 110 is known to those skilled in the art and will not be described further for the sake of brevity. The ac power may be transferred to and from the generator 105 and the motor 110 via machine phase leads 135a and 135b respectively.

Figure 2:
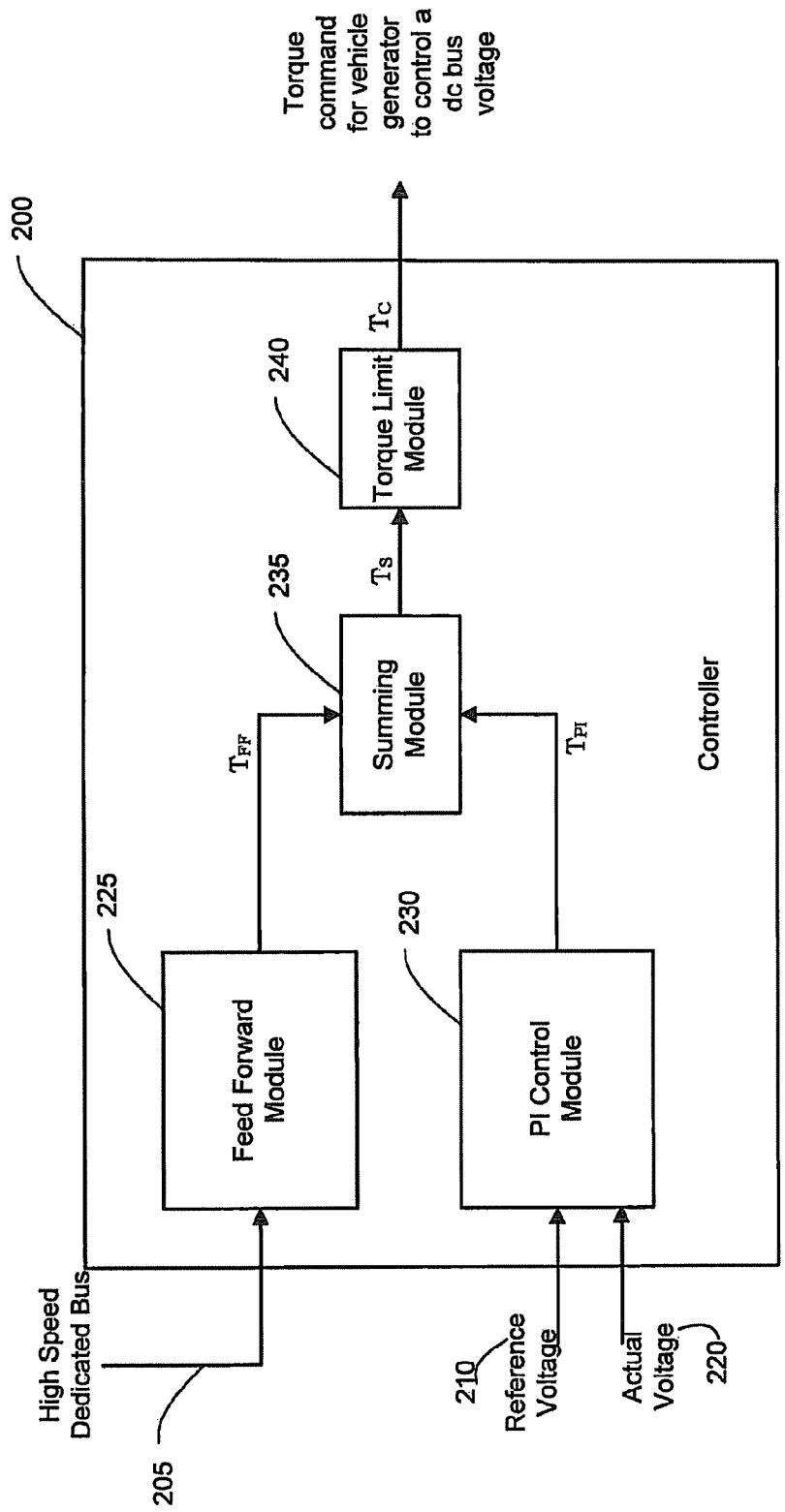
FIG. 2 illustrates a controller according to example embodiments.
Figure 3:
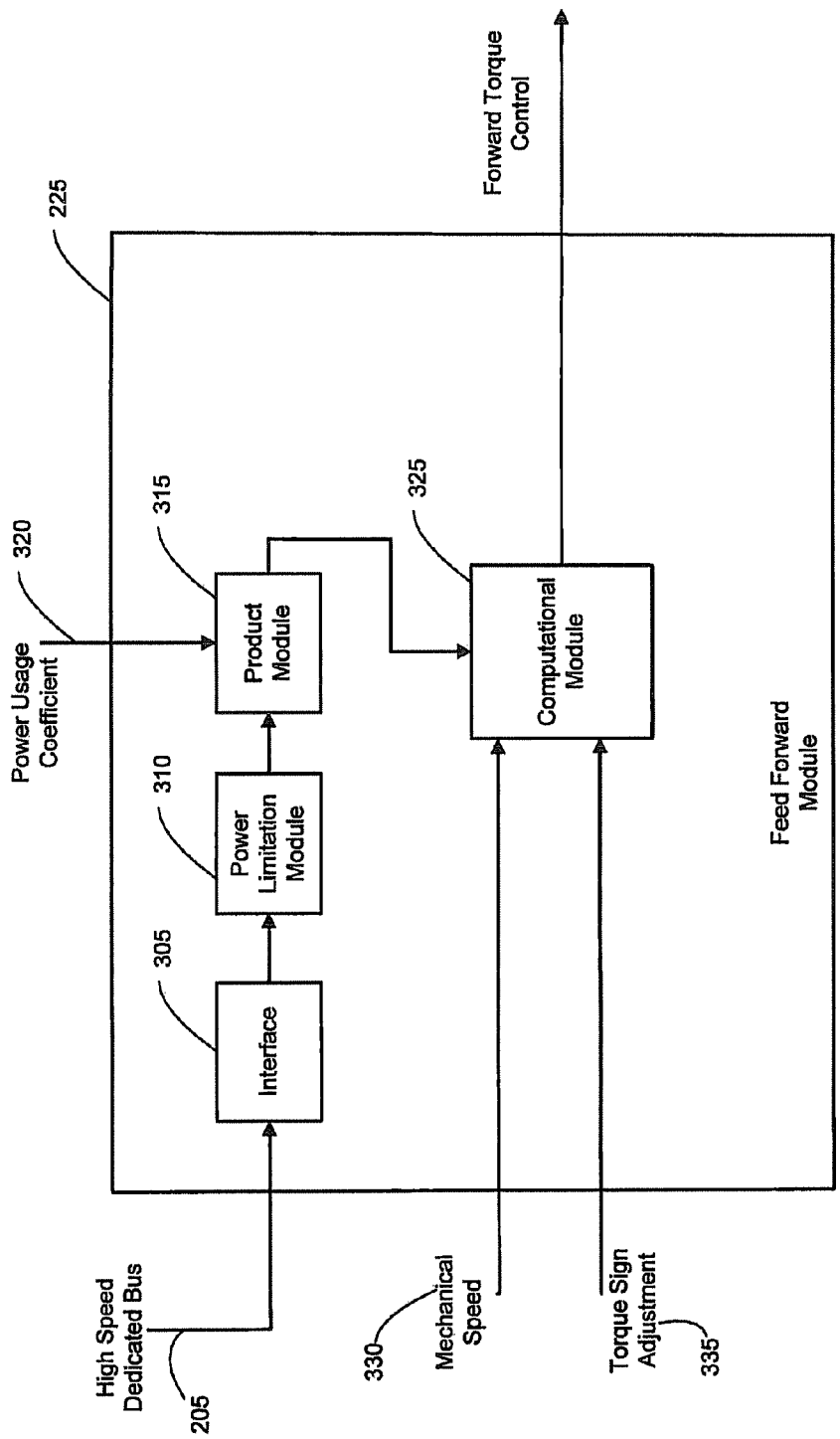
FIG. 3 illustrates a feed forward module according to example embodiments.
Figure 4:
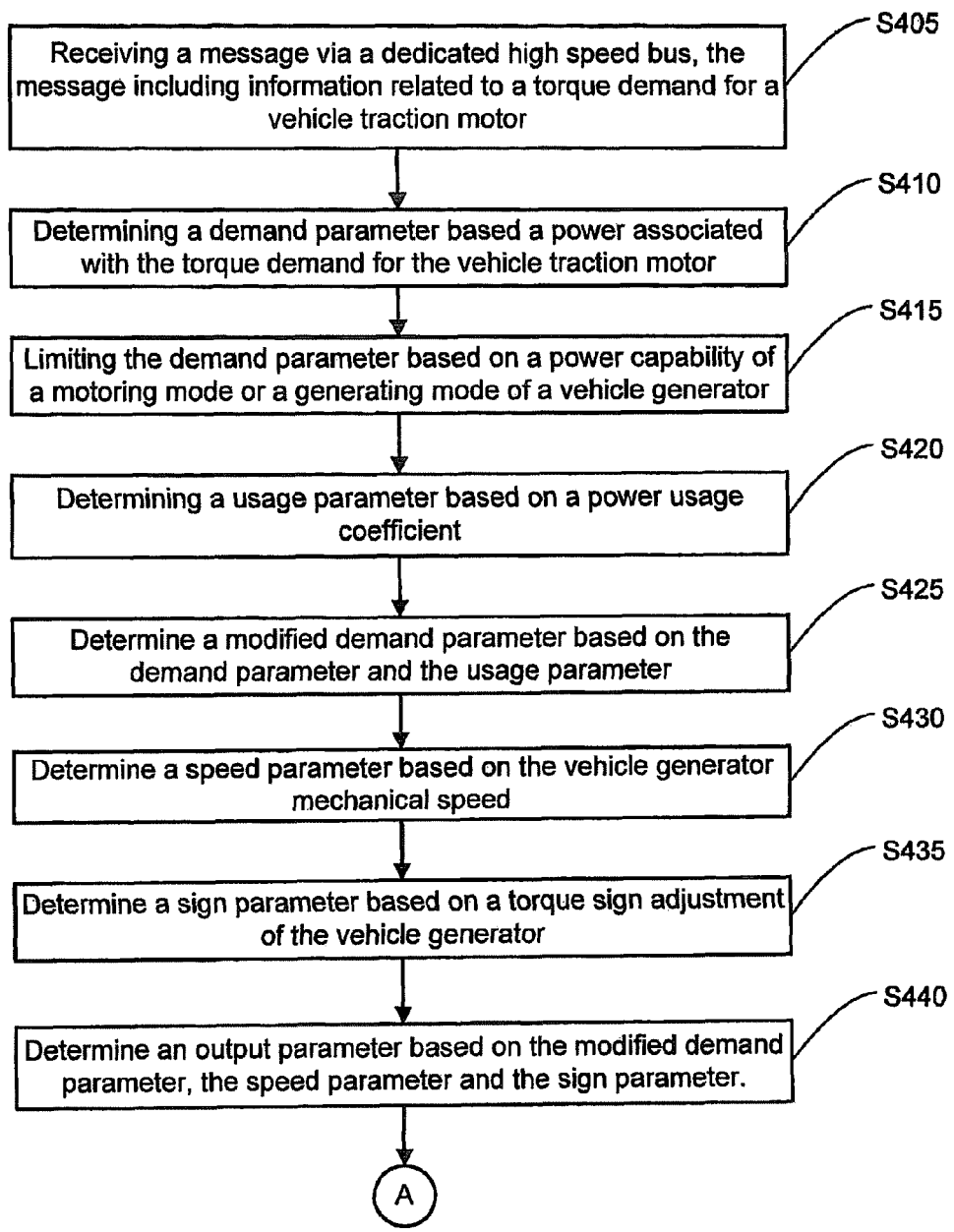
FIG. 4 illustrates a method of determining a feed forward torque value according to example embodiments.

Controller 130 may be a dc bus controller as described in more detail with regard to FIGS. 2-4. However, example embodiments are not limited thereto. A dedicated high speed bus 140a, 140b may communicate information associated with the generator 105 and the motor 110 to controller 130. For example, the dedicated high speed bus 140a, 140b may be a high speed controller area network (CAN) bus, a serial peripheral interface (SPI) bus and an Ethernet bus. For example, the dedicated high speed bus 140a, 140b may communicate a demand associated with the generator 105 and/or the motor 110. For example, the demand may be a power demand associated with the motor 110.

In describing the example embodiments, there may be various references to parameters, commands or controls. The parameters, commands or controls may be voltages, digital values, signals and the like. The voltages, digital values and signals may correspond to motor and/or generator conditions and or ratings. For example, a voltage value may correspond to a generator speed in mechanical rad/sec. For example, a digital value may correspond to a current torque condition associated with a motor in Newton-meters (N-m).

DC Bus Voltage Controller

FIG. 2 illustrates a controller 200 according to at least one example embodiment. As shown in FIG. 2, the controller may include a feed forward module 225, a proportional integral (PI) control module 230, a summing module 235 and a torque limit module 240. The controller 200 may be, for example the controller 130 shown in FIG. 1. However, example embodiments are not limited thereto. The controller 200 may be configured to control a dc bus voltage. For example, the controller 200 may be configured to generate a torque parameter or command for a vehicle generator (e.g., generator 105) to control the dc bus voltage.

The following description of a controller (e.g., controller 200) will begin with a description of feed forward control regarding FIGS. 3 and 4. The description will continue with a description of PI control referring to FIGS. 5 and 6. The description will conclude by returning to the controller of FIG. 2 and the flowchart of FIG. 7.

Feed Forward Control

To improve the dynamic response of dc bus voltage control, motor power (e.g., a traction motor) may be fed forward through dedicated communication path (e.g., high speed CAN, SPI, Ethernet, etc.) to a controller associated with the generator (e.g., generator 105). Generated torque associated with the motor (e.g., motor 110) should closely match the motors' torque command. Therefore, the product of the motor torque command, motoring or braking, and the motor mechanical speed may be a good representation of dc bus consumption power or regeneration power associated with the traction motor.

Any step change in the torque command from a vehicle controller may pass through slew limiter and secondary torque limiting blocks before the torque command can be converted to subsequent dq-axis current control commands for a generator. Therefore, the feed forward values should not be calculated based on vehicle controller torque command, which may have a relatively large step change and slow update rate. Instead, the feed forward power calculation may be synchronized with a torque control loop execution rate and based on the output from torque control loop, which has been processed by slew limiter and secondary torque limiting blocks in a traction motor controller.

As shown in FIG. 2, the feed forward module 225 may receive input information related to at least one of a vehicle generator (e.g., generator 105) and a vehicle motor (e.g., motor 110). The information may indicate a demand associated with the vehicle generator and/or the vehicle motor. For example, the demand may be a torque demand associated with the motor 110. The information may be received via a dedicated high speed bus 205. For example, the dedicated high speed bus may be one of dedicated high speed bus 140a or 140b. For example, the dedicated high speed bus 205 may be a high speed controller area network (CAN) bus, a serial peripheral interface (SPI) bus and an Ethernet bus. The feed forward module 205 will be described in more detail with regard to FIG. 3.

FIG. 3 illustrates a feed forward module 225 according to at least one example embodiment. The feed forward module 225 may include an interface 305, a power limitation module 310, a product module 315 and a computational module 325. The feed forward module 225 may be configured to generate a forward torque control parameter or command based on at least one of a demand received via the high speed dedicated bus 205, a mechanical speed 330, a torque sign adjustment 330 and a power usage coefficient. As described above with regard to FIG. 2, the forward torque control parameter or command may be an input to the summing module 235.

The interface 305 receives a message via the high speed dedicated bus 205. The message may include an indication of the demand. The demand may be, for example, a torque demand associated with the motor 110. For example, a user of the vehicle may adjust a pedal, adjust a lever or turn a switch to change a demand associated with motor 110.

The message may be associated with a protocol supported by one of a high speed controller area network (CAN) bus, a serial peripheral interface (SPI) bus and an Ethernet bus. The message may include one or more data packets. One of the data packets may include an indication of the demand.

For example, the data packet may include a digital variable that the interface 305 may use to determine a change in demand. The digital variable may indicate one of an increase or a decrease in demand as well as an amount of increase or decrease. The digital variable may also indicate an absolute demand. The interface 305 may determine and output a parameter or control value based the demand.

The power limitation module 310 may limit the determined parameter or control value output by the interface 305. The power limitation module 310 may limit the determined parameter or control value based on a power limitation of a vehicle generator (e.g., generator 105). For example, the power limitation module 310 may clip the determined parameter or control value if the determined parameter or control value is above a set value. For example, assume generator 105 has a maximum power rating of 50 kilowatts and a parameter or control value of 10 volts is representative of 50 kilowatts. If the parameter or control value is 15 volts, the power limitation module 310 may clip the parameter or control value to 10 volts.

In addition, the power limitation module 310 may limit the determined parameter or control value based on a motoring mode operation and a generating mode operation of the generator 105. For example, in the motoring mode operation the generator 105 may have a maximum power rating of 30 kilowatts and in the generating mode operation the generator 105 may have a maximum power rating of 50 kilowatts. The power limitation module 310 may limit the parameter or control value (e.g., representative voltage) accordingly.

The product module 315 may adjust the limited parameter or control value based on the power usage coefficient 320. The power usage coefficient 320 may be based on at least one of the motor operating mode, the generator operating mode, a dc bus voltage level associated with the motor and a generator associated with the vehicle and a test performance indication associated with at least one of the motor and the generator. For example, the product module 315 may multiply the limited parameter or control value by the power usage coefficient 320.

The power usage coefficient 320 setting controls how much feed forward power will be used in voltage feed forward control. The power usage coefficient 320 may have different settings when a motor (e.g., motor 110) is running in motoring mode or regeneration mode. In addition, the power usage coefficient 320 may also be set with different coefficients with respect to dc bus voltage level. Setting of the power usage coefficient 320 is a design choice and may even be optional. The power usage coefficient 320 may be application dependent per system testing performance as well.

For example, based on system testing the motor 110 may be 90% efficient when in the motoring mode. Therefore, the power usage coefficient 320 may be set to 0.9. However, the motor 110 may be 80% efficient when in the regeneration mode. Therefore, the power usage coefficient 320 may be set to 0.8. In addition, if the dc bus voltage level is 10% high, the power usage coefficient 320 may be set to 1.1 and 0.9 for each mode respectively. Further, if the dc bus voltage level is 10% low, the power usage coefficient 320 may be set to 0.9 and 0.7 for each mode respectively. Other settings for the power usage coefficient 320 can be reasonable determined by one skilled in the art.

The computation module 325 may determine the forward torque control parameter or command based on the output of the product module 315, the mechanical speed 330 and the torque sign adjustment 335. The mechanical speed 330 may be a rotational shaft speed associated with at least one of the motoring mode and the generating mode of the vehicle generator (e.g., generator 105). The torque sign adjustment 335 may be a rotation direction associated with at least one of the motoring mode and the generating mode of the generator (e.g., generator 105).

For example, the computation module 325 may determine the forward torque control parameter or command by multiplying the output of the product module 315 by the torque sign adjustment 335 and divide the result by the mechanical speed 330. The determined forward torque control parameter or command is then output by the feed forward module 225. The computation module 325 may determine the forward torque control parameter or command based on the following equation:

$$T_{FF} = \frac{R_{pm} \times TS}{\omega_{gen}}, \quad \text{Equation 1}$$

where,
$T_{FF}$ is the forward torque control parameter or command,
$R_{pm}$ is the output of the product module 315,
TS is the torque sign 335, and
$\omega_{gen}$ is the mechanical speed 330.

If, in the generator controller, the feed forward motor power value is positive, the generator may provide braking power to boost dc bus voltage. Otherwise, the generator may run in a motoring mode to reduce dc bus voltage. The sign of feed forward torque is dependent on generator speed and summarized below in Table 1.

TABLE 1

| Traction motor running mode | Traction motor feed forward power | Generator running mode | $\omega_{gen} < 0$ | $\omega_{gen} > 0$ |
|---|---|---|---|---|
| Traction motor regenerating | $P_{mot} < 0$ | Generator needs motoring and limited by its motoring power limit | $T_{feedforward} < 0$ | $T_{feedforward} > 0$ |

TABLE 1-continued

| Traction motor running mode | Traction motor feed forward power | Generator running mode | $\omega_{gen} < 0$ | $\omega_{gen} > 0$ |
|---|---|---|---|---|
| Traction motor motoring | $P_{mot} > 0$ | Generator needs braking and limited by its braking power limit | $T_{feedforward} > 0$ | $T_{feedforward} < 0$ | where, $P_{mot}$ is the motor (e.g., motor 110) feed forward power, $\omega_{gen}$ is the rotational rate of the generator (e.g., the rotational speed of the generator shaft), and $T_{feedforward}$ is the forward torque.

FIG. 4 illustrates a method of determining a feed forward torque value according to at least one example embodiment. The example embodiment described below with regard to FIG. 4 is described with regard to FIGS. 1-3 above. However, example embodiments are not limited thereto. Further, the example embodiment described below refers to controller 200 as illustrated in FIG. 2. However, example embodiments are not limited thereto.

Referring to FIG. 4, in step S405 a controller 200 receives a message via a dedicated high speed bus, the message including information related to a power demand for a vehicle traction motor. For example, as described above with regard to FIG. 3, the interface 305 receives a message via the high speed dedicated bus 205. The message may include an indication of the demand. The demand may be, for example, a power demand associated with the motor 110. The message may be associated with a protocol supported by one of a high speed controller area network (CAN) bus, a serial peripheral interface (SPI) bus and an Ethernet bus. The message may include one or more data packets. One of the data packets may include an indication of the demand.

Referring to FIG. 4, in step S410 the controller 200 determines a demand parameter based a power associated with the torque demand for the vehicle traction motor. For example, as described above with regard to FIG. 3, the data packet may include a digital variable that the interface 305 may use to determine a change in demand. The digital variable may indicate one of an increase or a decrease in demand as well as an amount of increase or decrease. The digital variable may also indicate an absolute demand. The interface 305 may determine and output a parameter or control value based the demand.

In step S415 the controller 200 limits the demand parameter based on a power capability of a motoring mode or a generating mode of a vehicle generator. For example, as described above with regard to FIG. 3, the power limitation module 310 may limit the determined demand parameter based on a power limitation of a vehicle generator. For example, the power limitation module 310 may clip the determined demand parameter if the determined parameter or control value is above a set value.

In step S420 the controller 200 determines a usage parameter based on a power usage coefficient. For example, as described above with regard to FIG. 3, the power usage coefficient 320 may be based on at least one of a motor (e.g., motor 110) operating mode, a generator (e.g., generator 105) operating mode, a dc bus voltage level associated with the motor and a generator associated with the vehicle and a test performance indication associated with at least one of the motor and the generator.

In step S425 the controller 200 determines a modified demand parameter based on the demand parameter and the usage parameter to determine a modified demand parameter. For example, as described above with regard to FIG. 3, the product module 315 may multiply the limited demand parameter or control value by the power usage coefficient 320.

In step S430 the controller 200 determines a speed parameter based on the vehicle generator mechanical speed. For example, as described above with regard to FIG. 3, the mechanical speed 330 may be a rotational shaft speed associated with at least one of the motoring mode and the generating mode of the vehicle generator (e.g., generator 105).

In step S435 the controller 200 determines a sign parameter based on a torque sign adjustment of the vehicle generator. For example, as described above with regard to FIG. 3, the torque sign adjustment 330 may be a rotation direction associated with at least one of the motoring mode and the generating mode of the generator (e.g., generator 105).

In step S440 the controller 200 determines an output parameter based on the modified demand parameter, the speed parameter and the sign parameter. For example, as described above with regard to FIG. 3, the computation module 325 may determine the forward torque control parameter or command by multiplying the output of the product module 315 by the torque sign adjustment 330 and divide the result by the mechanical speed 330. The determined forward torque control parameter or command is then output by the feed forward module 225.

Returning to FIG. 2, the determined forward torque control parameter or command output by the feed forward module 225 is shown as $T_{FF}$ which is an input to the summing module 235.

PI Control

Typically dc bus voltage control is to feed dc bus voltage error directly into a PI controller to output a torque command. This control strategy functions well during moderate levels of dynamic load change. However, with more challenging load power dynamics, example embodiments provide an improved dc bus voltage control by using a voltage-square error in a voltage PI controller.

Figure 5:
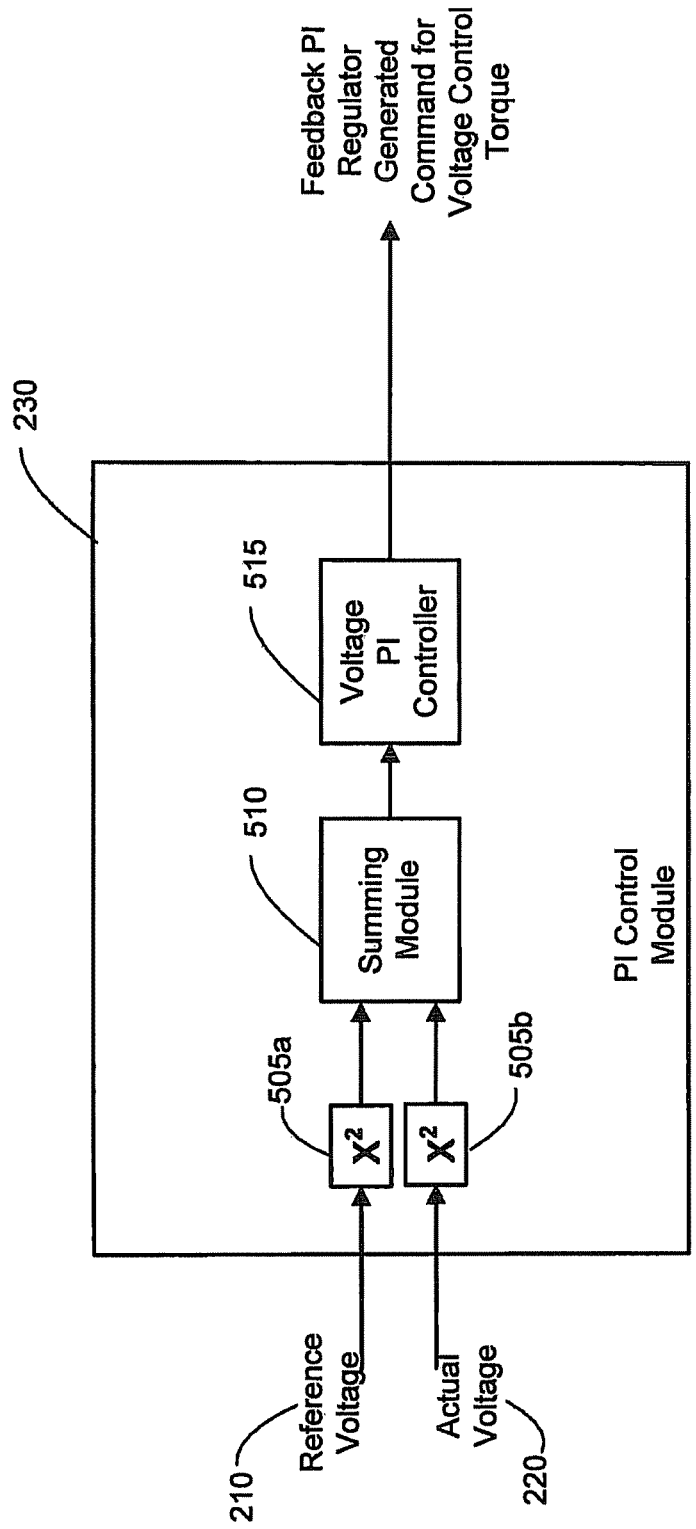
FIG. 5 illustrates a PI control module according to example embodiments.

FIG. 5 illustrates a proportional integral (PI) control module 230 according to at least one example embodiment. As shown in FIG. 5, the proportional integral (PI) control module 230 includes $X^2$ modules 505a and 505b, a difference module 510 and a voltage PI controller 515. The proportional integral (PI) control module 230 may generate a feedback PI regulator parameter or command based on at least one of a reference voltage and an actual voltage. The reference voltage 210 may be a reference dc bus voltage. For example, the reference voltage 210 may be a desired voltage associated with dc bus 105. The actual voltage 220 may be a current voltage or a determined (measured) voltage associated with the dc bus. For example, the actual voltage 220 may be a dc voltage measured at dc bus 150 by a voltage sensor associated with the dual inverter 115.

The $X^2$ modules 505a and 505b may determine a parameter that is equivalent to a square of an input voltage. For example, $X^2$ module 505a may determine a parameter that is the equivalent to the reference voltage 210 squared. Further, the $X^2$ module 505b may determine a parameter that is the equivalent to the actual or detected voltage 220 squared.

The difference module 510 may determine an output parameter based on the output of the $X^2$ modules 505a and 505b. The output parameter may be known as an error parameter or square error voltage. The difference module 510 may determine the error parameter by subtracting the output of $X^2$ module 505b (based on the actual or detected voltage 220)

from the output of $X^2$ module 505a (based on the reference voltage 210). The error parameter may be the input of the voltage PI controller 515.

The voltage PI controller 515 may generate the feedback PI regulator parameter or command based on the error parameter. The voltage PI controller 515 may be a proportional gain in parallel with an integrator based on a present error and an accumulation of past errors. The proportional gain provides fast error response. The integrator drives the system to a 0 steady-state error. Electric power used to maintain a dc bus voltage may be proportional to the vehicle generator shaft speed. For example, a relatively lower generator shaft speed may result in relatively greater corresponding PI gains for the PI controller such that a same dc bus voltage control dynamic performance may be achieved at varying generator shaft speeds.

Example embodiments provide an improved dc bus voltage control by using a voltage-square error in a voltage PI controller based on the following equations:

$$T_{PI} = \frac{1}{\omega_{gen}} \cdot \frac{dE_{bus}}{dt} = \left(\frac{1}{2} \cdot C_{bus} \cdot \frac{1}{\omega_{gen}}\right) \cdot \frac{dV_{bus}^2}{dt} = \frac{C_{bus}}{2\omega_{gen}} \cdot \frac{dV_{bus}^2}{dt}$$
Equation 2 where, $T_{PI}$ is the feedback PI regulator parameter or command,
$E_{bus}$ is an energy stored in the dc bus,
$\omega_{gen}$ is a rotational speed of the generator,
$V_{bus}$ is the dc bus voltage, and
$C_{bus}$ is a dc bus capacitance.

If the generator rotational speed and the dc bus capacitance are constants. From equation 1 the required output torque $T_{PI}$ is the integration of $V_{bus}^2$.

The PI controller input error is defined by subtracting the measured value from the reference value. For dc bus voltage control, if the measured voltage is less than the voltage reference, voltage PI may output braking torque to boost the bus voltage. On the other hand, if the measured voltage is higher than the voltage reference, voltage PI may output motoring torque to reduce the bus voltage. Because the sign of the braking torque or the motoring torque depends on the generator rotation direction, it may be desirable to adjust the sign of voltage PI error input as summarized in Table 2.

TABLE 2

| Voltage − square error | $\omega_{generator} > 0$ | | $\omega_{generator} < 0$ | |
|---|---|---|---|---|
| $V_{ref}^2 - V_{measure}^2 > 0$ | Voltage PI needs to output braking torque | Voltage PI needs negative input | Voltage PI needs to output braking torque | Voltage PI needs positive input |
| $V_{ref}^2 - V_{measure}^2 < 0$ | Voltage PI needs to output motoring torque | Voltage PI needs positive input | Voltage PI needs to output motoring torque | Voltage PI needs negative input | where, $\omega_{generator}$ is a rotational speed of the generator,
$V_{ref}^2$ is the dc bus voltage reference squared, and
$V_{measure}^2$ is the measured dc bus voltage squared.

Figure 6:
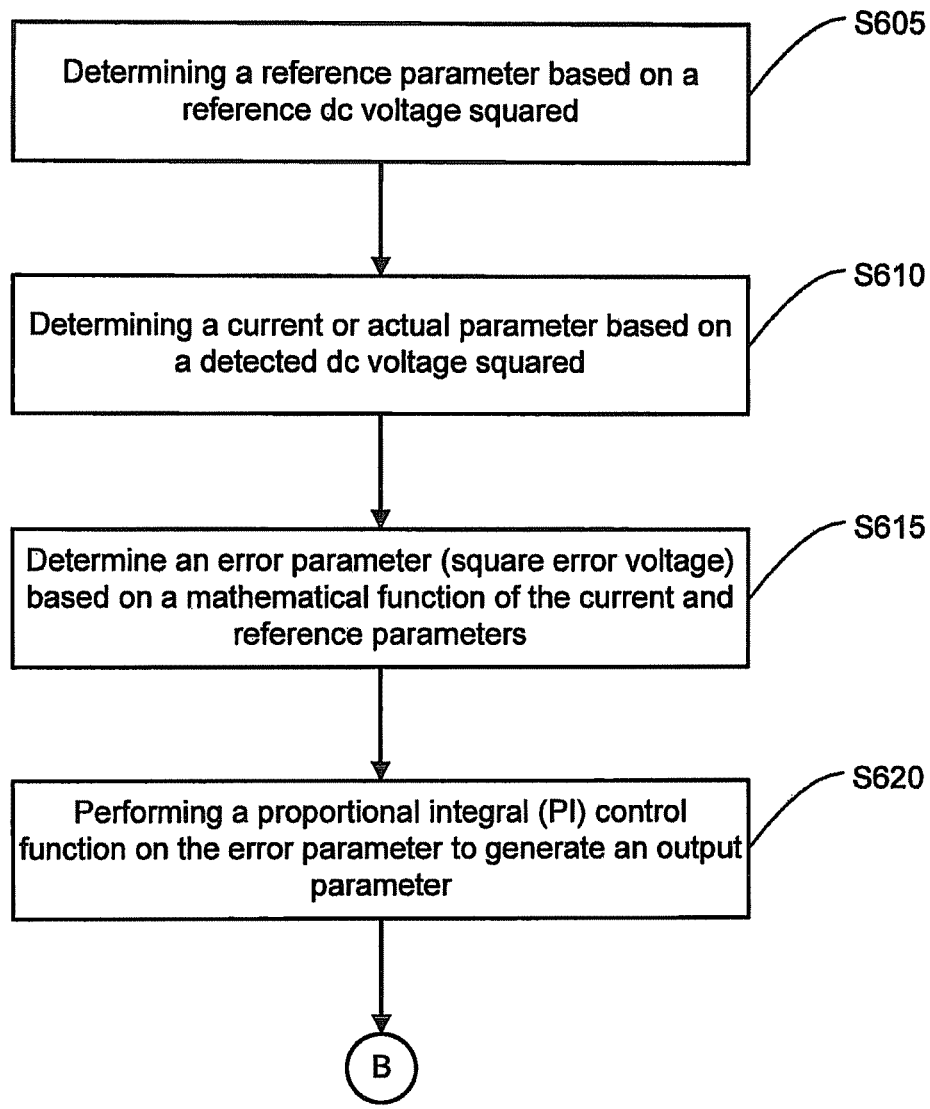
FIG. 6 illustrates a method of determining a PI control torque value according to example embodiments.

FIG. 6 illustrates a method of determining a PI control torque value according to at least one example embodiment. The example embodiment described below with regard to FIG. 6 is described with regard to FIGS. 1, 2 and 5 above. However, example embodiments are not limited thereto. Further, the example embodiment described below refers to controller 200 as illustrated in FIG. 2. However, example embodiments are not limited thereto.

Referring to FIG. 6, in step S605 a controller 200 determines a reference parameter based on a reference dc voltage squared. For example, as described above with regard to FIG. 4, reference voltage 210 is input into $X^2$ module 405a. $X^2$ module 405a outputs a parameter that is the equivalent to the reference voltage 210 squared. The parameter output from $X^2$ module 405a may be the determined reference parameter.

Referring to FIG. 6, in step S610 the controller 200 determines a current or actual parameter based on a detected dc voltage squared. For example, as described above with regard to FIG. 4, actual voltage 220 is input into $X^2$ module 405b. $X^2$ module 405b outputs a parameter that is the equivalent to the actual voltage 220 squared. The parameter output from $X^2$ module 405b may be the determined actual parameter.

Referring to FIG. 6, in step S615 the controller 200 determines an error parameter (square error voltage based on a mathematical function of the determined reference parameter and the determined actual parameter. For example, as described above with regard to FIG. 5, the output of $X^2$ module 505a (e.g., the reference parameter) and the output of $X^2$ module 505b (e.g., the actual parameter) are inputs to the difference module 510. The difference module 510 may determine the error parameter by subtracting the output of $X^2$ module 505b from the output of $X^2$ module 505a. Further, there may be a sign adjustment to the error parameter as shown above in Table 2.

In step S620 the controller 200 generates an output parameter based on a proportional integral (PI) control function and the error parameter after proper sign adjustment. For example, as described above with regard to FIG. 5, the voltage PI controller 515 may generate the feedback PI regulator parameter or command (output parameter) based on the error parameter.

Returning to FIG. 2, the output of the voltage PI controller 230 (e.g., the generated feedback PI regulator parameter or command) is shown as $T_{PI}$ which is an input to the summing module 235.

Controlling Bus Based on PI Control and Feed Forward Control

As shown in FIG. 2, the summing module 235 receives inputs from the feed forward module 225 (e.g., $T_{FF}$) and the proportional integral (PI) control module 230 (e.g., $T_{PI}$). The summing module 235 may generate a torque value (the torque value may also be referred to as a torque parameter or torque command) based on the inputs from the feed forward module 225 and the proportional integral (PI) control module 230. For example, the summing module 235 may generate the torque value by summing the input from the feed forward module 225 with the input from the proportional integral (PI) control module 230.

The torque limit module 240 may limit the generated torque value based on a torque limit associated with a vehicle generator or vehicle motor. For example, the torque limit module 240 may limit the generated torque value based on a torque limit associated with generator 105. The limited torque value generated by the torque limit module 240 may be the torque value for the vehicle generator (e.g., generator 105) to control the dc bus voltage.

Figure 7:
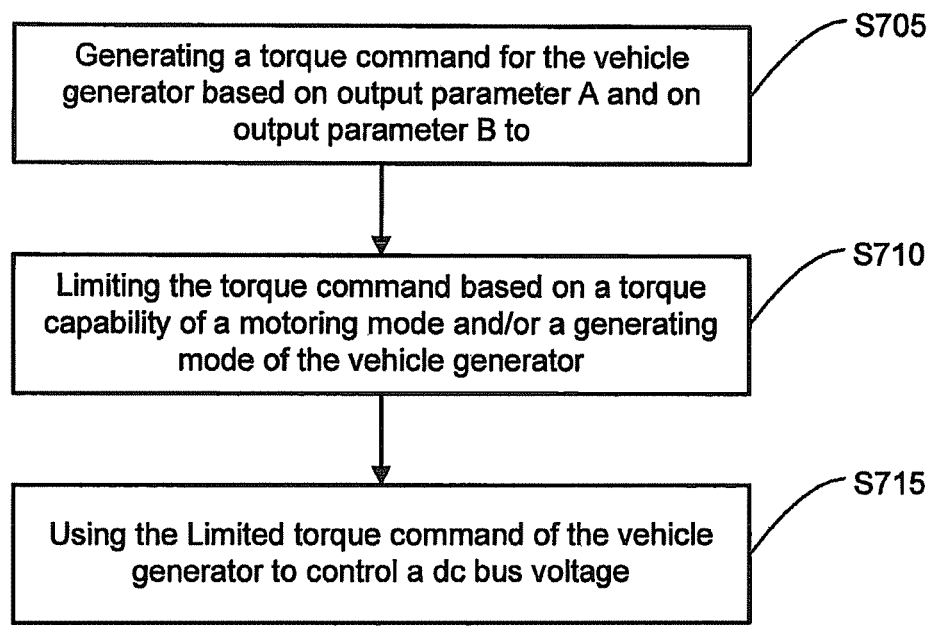
FIG. 7 illustrates a method of generating a torque value to control a dc bus voltage according to example embodiments.

FIG. 7 illustrates a method of generating a torque value to control a dc bus voltage according to at least one example embodiment. The example embodiment described below with regard to FIG. 7 is described with regard to FIGS. 1 and 2 above. However, example embodiments are not limited thereto. Further, the example embodiment described below refers to controller 200 as illustrated in FIG. 2. However, example embodiments are not limited thereto.

Referring to FIG. 7, in step S705 a controller 200 generates a torque value for the vehicle generator based on output parameter A and on output parameter B. Output parameter A may be the output from step S440 (e.g., $T_{FF}$) as described above with regard to FIG. 4. Output parameter B may be the output from step S620 (e.g., $T_{PI}$) as described above with regard to FIG. 6.

For example, as described above with regard to FIG. 2, the summing module 235 may generate a torque value based on the inputs from the feed forward module 225 (e.g., $T_{FF}$) and the proportional integral (PI) control module 230 (e.g., $T_{PI}$). For example, the summing module 235 may generate the torque value by summing the input from the feed forward module 225 with the input from the proportional integral (PI) control module 230. For example, the summing module 235 may generate a torque value based on the following equation:

$$T_S = T_{FF} + T_{PI}$$

where, $T_S$ is the torque value, $T_{FF}$ is the forward torque control parameter or command, and $T_{PI}$ is the feedback PI regulator parameter or command.

Referring to FIG. 7, in step S710 the controller 200 limits the torque value based on a torque capability of a motoring mode and/or a generating mode of the vehicle generator. For example, as described above with regard to FIG. 2, the torque limit module 240 may limit the generated torque value based on a torque limit associated with a vehicle generator or vehicle motor. The limited torque parameter or command is shown as $T_C$.

For example, the torque limit module 240 may limit the generated torque value based on a torque limit associated with generator 105. For example, the torque limitation module 240 may clip the generated torque value if the generated torque value is above a set value. For example, assume generator 105 has a maximum torque rating of 50 N-m and a torque value of 10 volts is representative of 50 N-m. If the torque value is 15 volts, the torque limitation module 240 may clip the torque value to 10 volts.

In step 715 the controller 200 uses the limited torque value of the vehicle generator to control a dc bus voltage. For example, as described above with regard to FIG. 2, the limited torque value $T_C$ generated by the torque limit module 240 may be the torque value for the vehicle generator (e.g., generator 105) to control the dc bus voltage.

As described above, the diesel engine and the generator have an associated controller. The controller receives a control signal (e.g., a torque control signal) to indicate a manner by which the controller should be controlling the diesel engine and the generator. For example, the control signal may be a torque value that the generator is to be set to. By setting the generator to this torque value the generator controls the dc bus voltage to the desired voltage.

For example, the control signal may indicate a steady-state, an increased demand or a decreased demand for the generator torque value. In this way the diesel engine and the generator regulate a desired dc bus voltage. There may be a comparison between the current torque value and the torque control signal (e.g., controlled torque). If the torque control signal stays constant (no difference as compared to the current torque value) no change in dc bus voltage occurs. However, if the value of the torque control signal increases, the dc bus voltage may increase and if the value of the torque control signal decreases, the dc bus voltage may decreases.

According to example embodiments, the limited torque value $T_C$ generated by the torque limit module 240 may be the control signal used by the controller associated with the diesel engine and the generator to control dc bus (e.g., dc bus 150) voltage. For example, the limited torque value $T_C$ generated by the torque limit module 240 may be an input to the torque command generation module 805 described below with regard to FIG. 8.

System Controller

Figure 8:
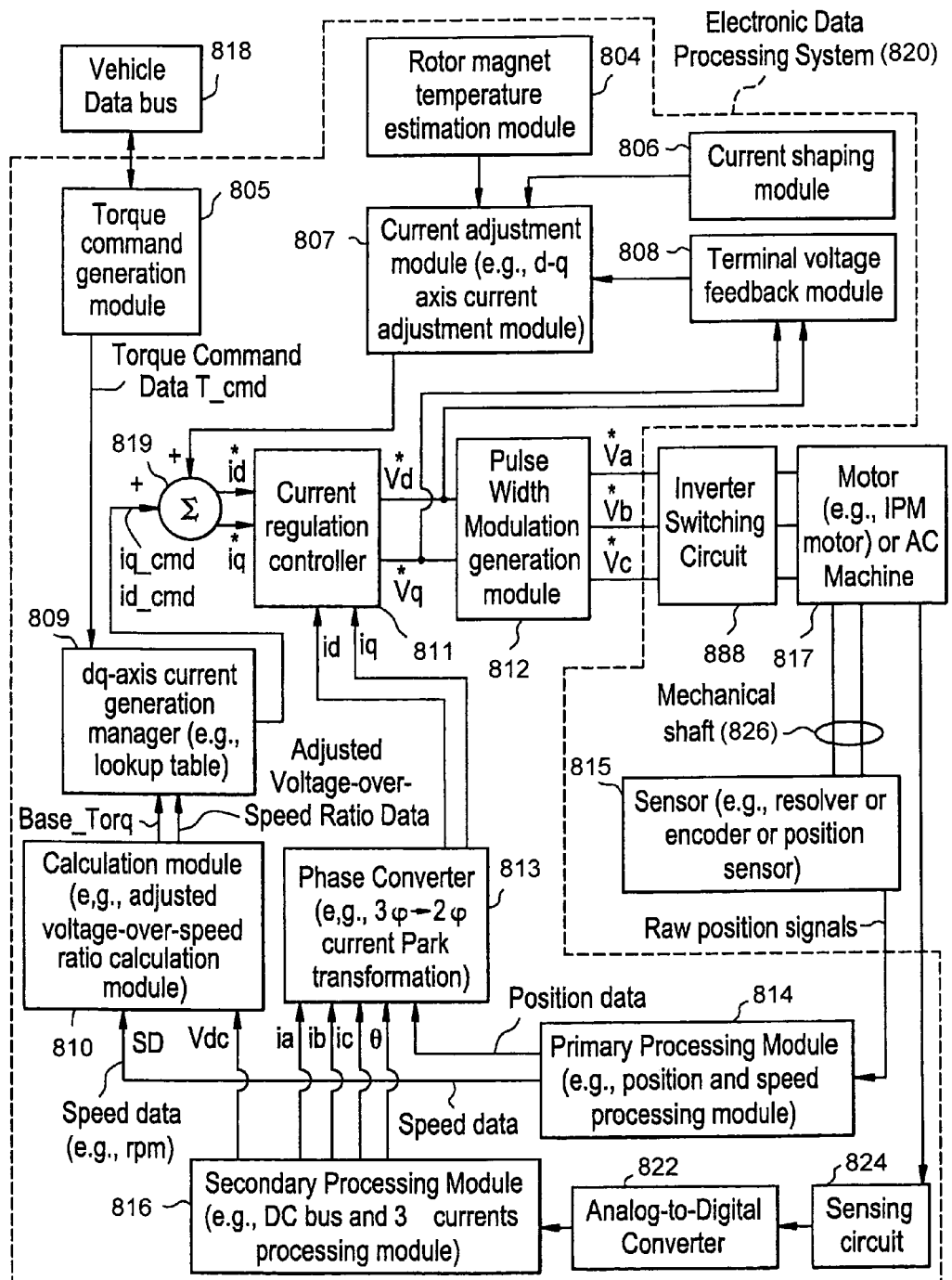
FIG. 8 is a block diagram of an example embodiment of a system for controlling an electrical motor.

In accordance with an example embodiment, FIG. 8 discloses a system for controlling an IPM machine such as a motor 817 (e.g., an interior permanent magnet (IPM) motor) or another alternating current machine. The motor 817 has a nominal dc bus voltage (e.g., 320 Volts). The nominal voltage is a named voltage. For example, a nominal voltage of the motor 817 may be 320 Volts, but the motor may operate at a voltage above and below 320 Volts. In an example embodiment, the system, aside from the motor 817, may be referred to as an inverter or a motor controller. The system for controlling the motor 817 may also be referred to as an IPM machine system.

The system includes electronic modules, software modules, or both. In an example embodiment, the motor controller includes an electronic data processing system 820 to support storing, processing or execution of software instructions of one or more software modules. The electronic data processing system 820 is indicated by the dashed lines in FIG. 8 and is shown in greater detail in FIG. 9. The electronic data processing system 820 may also be referred to as a controller for the motor 817.

The data processing system 820 is coupled to an inverter circuit 888. The inverter circuit 888 includes a semiconductor drive circuit that drives or controls switching semiconductors (e.g., insulated gate bipolar transistors (IGBT) or other power transistors) to output control signals for the motor 817. In turn, the inverter circuit 888 is coupled to the motor 817. The motor 817 is associated with a sensor 815 (e.g., a position sensor, a resolver or encoder position sensor) that is associated with the motor shaft 826 or the rotor. The sensor 815 and the motor 817 are coupled to the data processing system 820 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 888, three phase voltage data, or other thermal or performance information for the motor 817.

In an example embodiment, a torque command generation module 805 is coupled to a d-q axis current generation manager 809 (e.g., d-q axis current generation look-up tables). The d-q axis current refers to the direct axis current and the quadrature axis current as applicable in the context of vector-controlled alternating current machines, such as the motor 817. The output of the d-q axis current generation manager 809 (d-q axis current commands iq_cmd and id_cmd) and the output of a current adjustment module 807 (e.g., d-q axis current adjustment module 807) are fed to a summer 819. In turn, one or more outputs (e.g., direct axis current data (id*) and quadrature axis current data (iq*)) of the summer 819 are provided or coupled to a current regulation controller 811. While the term in current command is used, it should be understood that current command refers to a target current value.

The current regulation controller 811 is capable of communicating with the pulse-width modulation (PWM) generation module 812 (e.g., space vector PWM generation module). The current regulation controller 811 receives respective adjusted d-q axis current commands (e.g., id* and iq*) and actual d-q axis currents (e.g., id and iq) and outputs corresponding d-q axis voltage commands (e.g., vd* and vq* commands) for input to the PWM generation module 812.

In an example embodiment, the PWM generation module 812 converts the direct axis voltage and quadrature axis voltage data from two phase data representations into three phase representations (e.g., three phase voltage representations, such as va*, vb* and vc*) for control of the motor 817, for example. Outputs of the PWM generation module 812 are coupled to the inverter circuit 888.

The inverter circuit 888 includes power electronics, such as switching semiconductors to generate, modify and control pulse-width modulated signals or other alternating current signals (e.g., pulse, square wave, sinusoidal, or other waveforms) applied to the motor 817. The PWM generation module 812 provides inputs to a driver stage within the inverter circuit 888. An output stage of the inverter circuit 888 provides a pulse-width modulated voltage waveform or other voltage signal for control of the motor 817. In an example embodiment, the inverter 888 is powered by a direct current (dc) voltage bus.

The motor 817 is associated with the sensor 815 (e.g., a resolver, encoder, speed sensor, or another position sensor or speed sensors) that estimates at least one of an angular position of the motor shaft 826, a speed or velocity of the motor shaft 826, and a direction of rotation of the motor shaft 826. The sensor 815 may be mounted on or integral with the motor shaft 826. The output of the sensor 815 is capable of communication with the primary processing module 814 (e.g., position and speed processing module). In an example embodiment, the sensor 815 may be coupled to an analog-to-digital converter (not shown) that converts analog raw position data or velocity data to digital raw position or velocity data, respectively. In other example embodiments, the sensor 815 (e.g., digital position encoder) may provide a digital data output of raw position data or velocity data for the motor shaft 826 or rotor.

A first output (e.g., position data 0 for the motor 817) of the primary processing module 814 is communicated to the phase converter 813 (e.g., three-phase to two-phase current Park transformation module) that converts respective three-phase digital representations of measured current into corresponding two-phase digital representations of measured current. A second output (e.g., speed data SD for the motor 817) of the primary processing module 814 is communicated to the calculation module 810 (e.g., adjusted voltage over speed ratio module).

An input of a sensing circuit 824 is coupled to terminals of the motor 817 for sensing at least the measured three-phase currents and a voltage level of the direct current (dc) bus (e.g., high voltage dc bus which may provide dc power to the inverter circuit 888). An output of the sensing circuit 824 is coupled to an analog-to-digital converter 822 for digitizing the output of the sensing circuit 824. In turn, the digital output of the analog-to-digital converter 822 is coupled to the secondary processing module 816 (e.g., dc bus voltage and three phase current processing module). For example, the sensing circuit 824 is associated with the motor 817 for measuring three phase currents (e.g., current applied to the windings of the motor 817, back EMF (electromotive force) induced into the windings, or both).

Certain outputs of the primary processing module 814 and the secondary processing module 816 feed the phase converter 813. For example, the phase converter 813 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 816 and position data θ from the sensor 815. The output of the phase converter 813 module (id, iq) is coupled to the current regulation controller 811.

Other outputs of the primary processing module 814 and the secondary processing module 816 may be coupled to inputs of the calculation module 810 adjusted voltage overspeed ratio calculation module). For example, the primary processing module 814 may provide the speed data SD (e.g., motor shaft 826 speed in revolutions per minute), whereas the secondary processing module 816 may provide a measured (detected) level of the operating dc bus voltage Vdc of the motor 817 (e.g., on the dc bus of a vehicle). The dc voltage level on the dc bus that supplies the inverter circuit 888 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 810 is connected as an intermediary between the secondary processing module 816 and the d-q axis current generation manager 809. The output of the calculation module 810 can adjust or impact the current commands iq_cmd and id_cmd generated by the d-q axis current generation manager 809 to compensate for fluctuation or variation in the dc bus voltage, among other things.

The rotor magnet temperature estimation module 804, the current shaping module 806, and the terminal voltage feedback module 808 are coupled to or are capable of communicating with the d-q axis current adjustment module 807. In turn, the d-q axis current adjustment module 807 may communicate with the d-q axis current generation manager or the summer 819.

The rotor magnet temperature estimation module 804 estimates or determines the temperature of the rotor permanent magnet or magnets. In an example embodiment, the rotor magnet temperature estimation module 804 may estimate the temperature of the rotor magnets from, one or more sensors located on the stator, in thermal communication with the stator, or secured to the housing of the motor 817.

In another example embodiment, the rotor magnet temperature estimation module 804 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In an example embodiment, the method or system may operate in the following manner. The torque command generation module 805 receives an input control data message, such as a speed control data message, a voltage control data message, or a torque control data message, over a vehicle data bus 818. The torque command generation module 805 converts the received input control message into torque control command data T_cmd.

The d-q axis current generation manager 809 selects or determines the direct axis current command and the quadrature axis current command associated with respective torque control command data and respective detected motor shaft 826 speed data SD. For example, the d-q axis current generation manager 809 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 815 on the motor 817 facilitates provision of the detected speed data SD for the motor shaft 826, where the primary processing module 814 may convert raw position data provided by the sensor 815 into speed data SD.

The current adjustment module 807 (e.g., d-q axis current adjustment module) provides current adjustment data to adjust the direct axis current command id_cmd and the quadrature axis current command iq_cmd based on input data from the rotor magnet temperature estimation module 804, the current shaping module 806, and terminal voltage feedback module 808.

The current shaping module 806 may determine a correction or preliminary adjustment of the quadrature axis (q-axis) current command and the direct axis (d-axis) current command based on one or more of the following factors: torque load on the motor 817 and speed of the motor 817, for example. The rotor magnet temperature estimation module 804 may generate a secondary adjustment of the q-axis current command and the d-axis current command based on an estimated change in rotor temperature, for example. The terminal voltage feedback module 808 may provide a third adjustment to d-axis and q-axis current based on controller voltage command versus voltage limit. The current adjustment module 807 may provide an aggregate current adjustment that considers one or more of the following adjustments: a preliminary adjustment, a secondary adjustment, and a third adjustment.

In an example embodiment, the motor 817 may include an interior permanent magnet (IPM) machine or a synchronous IPM machine (IPMSM).

The sensor 815 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 815 includes a position sensor, where raw position data and associated time data are processed to determine speed or velocity data for the motor shaft 826. In another configuration, the sensor 815 includes a speed sensor, or the combination of a speed sensor and an integrator to determine the position of the motor shaft.

In yet another configuration, the sensor 815 includes an auxiliary, compact direct current generator that is coupled mechanically to the motor shaft 826 of the motor 817 to determine speed of the motor shaft 826, where the direct current generator produces an output voltage proportional to the rotational speed of the motor shaft 826. In still another configuration, the sensor 815 includes an optical encoder with an optical source that transmits a signal toward a rotating object coupled to the motor shaft 826 and receives a reflected or diffracted signal at an optical detector, where the frequency of received signal pulses (e.g., square waves) may be proportional to a speed of the motor shaft 826. In an additional configuration, the sensor 815 includes a resolver with a first winding and a second winding, where the first winding is fed with an alternating current, where the voltage induced in the second winding varies with the frequency of rotation of the rotor.

Figure 9:
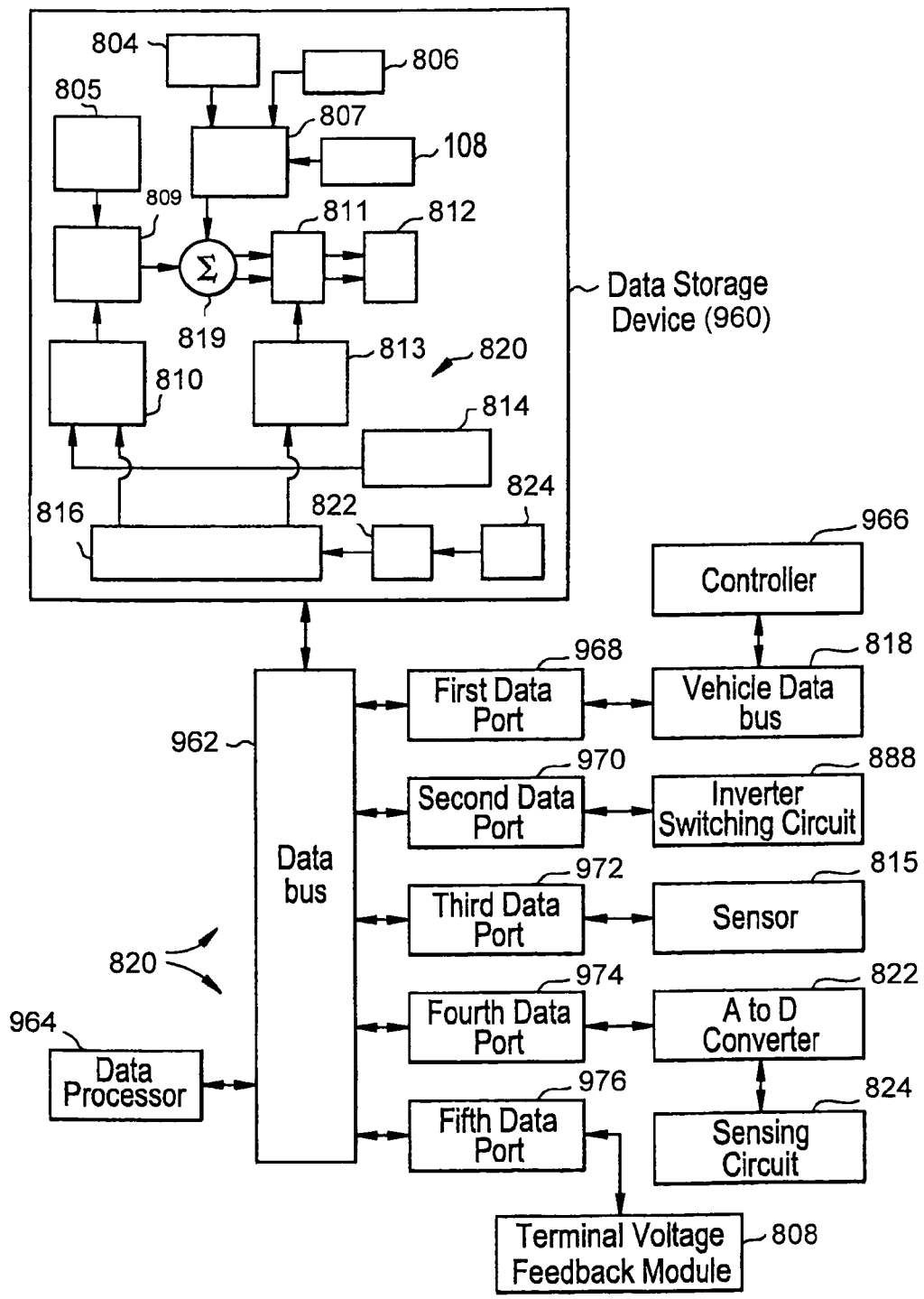
FIG. 9 is a block diagram of an electronic data processing system consistent with FIG. 8.

In FIG. 9, the electronic data processing system 820 includes an electronic data processor 964, a data bus 962, a data storage device 960, and one or more data ports (968, 970, 972, 974 and 976). The data processor 964, the data storage device 960 and one or more data ports are coupled to the data bus 962 to support communications of data between or among the data processor 964, the data storage device 960 and one or more data ports.

In an example embodiment, the data processor 964 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 960 may include any magnetic, electronic, or optical device for storing data. For example, the data storage device 960 may include an electronic data storage device, an electronic memory, non-volatile electronic random access memory, one or more electronic data registers, data latches, a magnetic disc drive, a hard disc drive, an optical disc drive, or the like.

As shown in FIG. 9, the data ports include a first data port 968, a second data port 970, a third data port 972, a fourth data port 974 and a fifth data port 976, although any suitable number of data ports may be used. Each data port may include a transceiver and buffer memory, for example. In an example embodiment, each data port may include any serial or parallel input/output port.

In an example embodiment as illustrated in FIG. 9, the first data port 968 is coupled to the vehicle data bus 818. In turn, the vehicle data bus 818 is coupled to a controller 966. In one configuration, the second data port 970 may be coupled to the inverter circuit 888; the third data port 972 may be coupled to the sensor 815; the fourth data port 974 may be coupled to the analog-to-digital converter 822; and the fifth data port 976 may be coupled to the terminal voltage feedback module 808. The analog-to-digital converter 822 is coupled to the sensing circuit 824.

In an example embodiment of the data processing system 820, the torque command generation module 805 is associated with or supported by the first data port 968 of the electronic data processing system 820. The first data port 968 may be coupled to a vehicle data bus 818, such as a controller area network (CAN) data bus. The vehicle data bus 818 may provide data bus messages with torque commands to the torque command generation module 805 via the first data port 968. The operator of a vehicle may generate the torque commands via a user interface, such as a throttle, a pedal, the controller 966, or other control device.

In some example embodiments, the sensor 815 and the primary processing module 814 may be associated with or supported by a third data port 972 of the data processing system 820.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method of controlling a vehicle dc bus voltage, the method comprising:
generating a first parameter, by a controller, the first parameter being based on a reference dc bus voltage squared;
generating a second parameter, by the controller, the second parameter being based on a detected dc bus voltage squared; and
controlling, by the controller, the vehicle dc bus voltage, the controlling including,
determining a square error difference between the first parameter and the second parameter,
determining a sign of the square error difference and whether to adjust the sign of the square error difference based on a mode of a generator associated with the vehicle, the mode being one of a motoring mode operation and a generating mode, and
controlling the vehicle dc bus voltage based on the square error difference and the sign of the square error difference.

2. The method of claim 1, comprising:
generating a third parameter, the third parameter being based on the square error difference of the first and the second parameters; and
generating a fourth parameter, the fourth parameter being generated based on a function having the third parameter as an input, wherein
the controlling step includes controlling the vehicle dc bus voltage based on the fourth parameter.

3. The method of claim 2, wherein the function is a proportional integral (PI) function.

4. The method of claim 2, comprising:
receiving a fifth parameter, the fifth parameter being based on a demand associated with at least one of a motoring mode operation and a generating mode operation of a motor associated with the vehicle, wherein
the controlling step includes controlling the vehicle dc bus voltage based on the fourth parameter and the fifth parameter.

5. The method of claim 4, comprising:
determining a sum of the fourth parameter and the fifth parameter; and
limiting the sum of the fourth parameter and the fifth parameter based on a torque limit associated with the mode of the generator associated with the vehicle, wherein
the controlling step includes controlling the vehicle dc bus voltage based on the limited sum of the fourth parameter with the fifth parameter.

6. The method of claim 4, wherein the fifth parameter is based on,
a rotational speed associated with the mode of the generator associated with the vehicle, and
a rotation direction associated with the mode of the generator associated with the vehicle.

7. The method of claim 4, wherein the demand is a feed forward power demand.

8. The method of claim 1, wherein controlling the vehicle bus voltage includes controlling a torque value associated with the generator to control the vehicle dc bus voltage.

9. A controller for controlling a vehicle dc bus voltage, the controller comprising:
a first module configured to generate a first parameter, the first parameter being based on a reference dc bus voltage squared;
a second module configured to generate a second parameter, the second parameter being based on the detected bus voltage squared; and
a voltage controller configured to,
determine a square error difference between the first parameter and the second parameter,
determine a sign of the square error difference and whether to adjust the sign of the square error difference based on a mode of a generator associated with the vehicle, the mode being one of a motoring mode operation and a generating mode, and
control the vehicle dc bus voltage based on the square error difference and the sign of the square error difference.

10. The controller of claim 9, comprising:
a summing module configured to generate a third parameter, the third parameter being based on the first and the second parameters, wherein
the voltage controller is configured to generate a fourth parameter, the fourth parameter being generated based on a function having the third parameter as an input, and
the voltage controller is configured to control the vehicle dc bus voltage based on the fourth parameter.

11. The controller of claim 10, wherein the function is a proportional integral (PI) function.

12. The controller of claim 10, comprising:
a feed forward module configured to generate a fifth parameter, the fifth parameter being based on a demand associated with at least one of a motoring mode operation and a generating mode operation of a motor associated with the vehicle, wherein
the voltage controller is configured to control the vehicle dc bus voltage based on the fourth parameter and the fifth parameter.

13. The controller of claim 12, comprising:
determining a sum of the fourth parameter and the fifth parameter; and
a torque limit module configured to limit the sum of the fourth parameter and the fifth parameter based on a torque limit associated with the mode of the generator associated with the vehicle, wherein
the voltage controller is configured to control the vehicle dc bus voltage based on the limited sum of the fourth parameter with the fifth parameter.

14. The controller of claim 12, wherein the fifth parameter is based on,
a rotational shaft speed associated with the mode of the generator associated with the vehicle, and
a rotation direction associated with the mode of the generator associated with the vehicle.

15. The controller of claim 9, wherein the voltage controller is a voltage proportional integral (PI) controller.

16. The controller of claim 9, wherein controlling the vehicle bus voltage includes controlling a torque value associated with the generator to control the vehicle dc bus voltage.

* * * * *